INVENTORS
GENE ROSS
DAVID S. ROSS
BY
Cushman, Darby & Cushman
ATTORNEYS

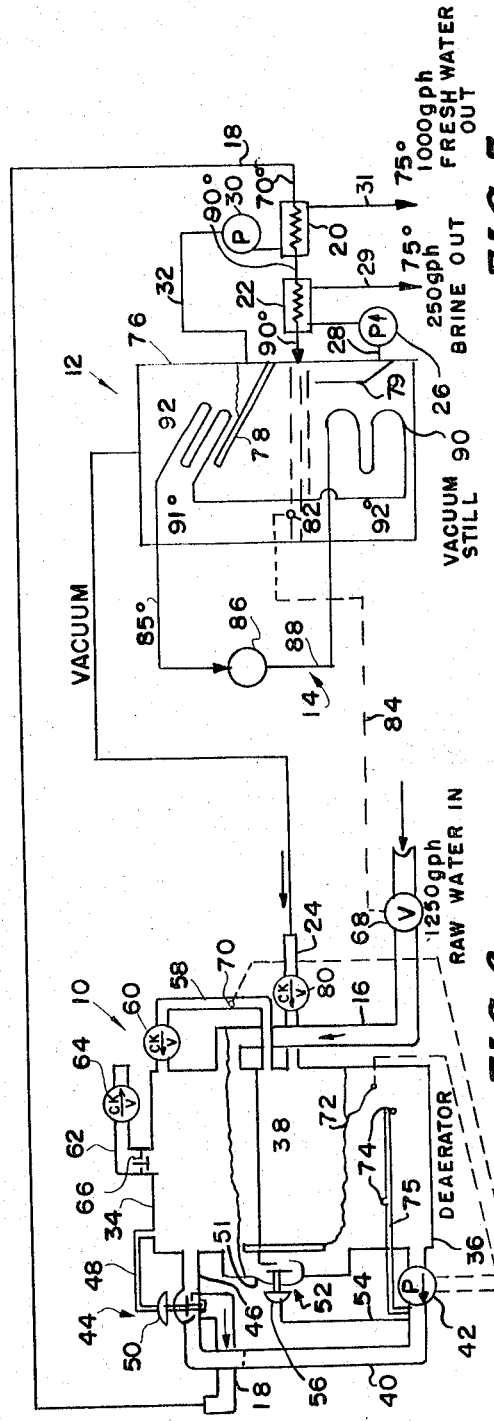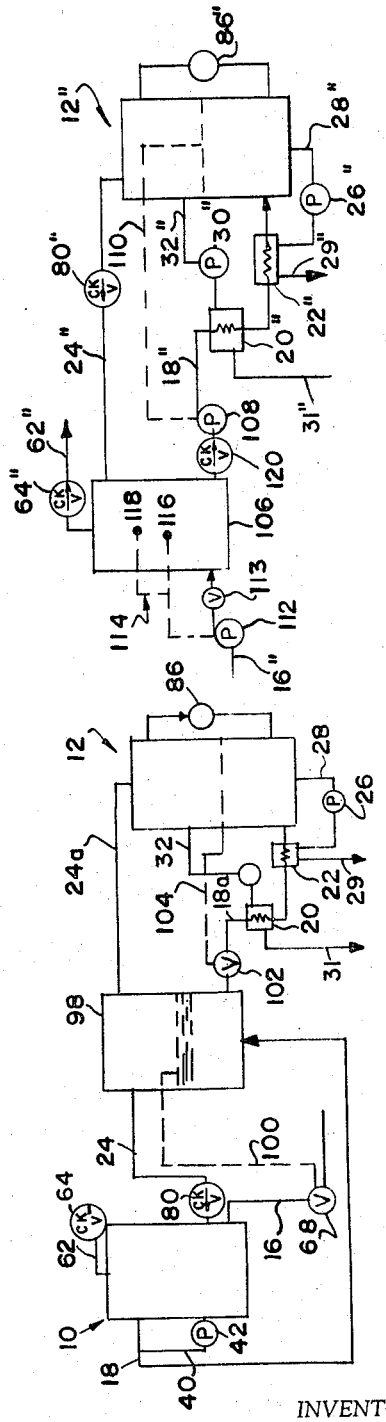

United States Patent Office 3,300,392
Patented Jan. 24, 1967

3,300,392
VACUUM DISTILLATION INCLUDING PRE-DEGASIFICATION OF DISTILLAND
Gene W. Ross and David S. Ross, Lorain, Ohio, assignors to Amcodyne & Co., Lorain, Ohio, an Ohio limited partnership
Continuation of application Ser. No. 199,378, June 1, 1962. This application Apr. 5, 1966, Ser. No. 547,691
16 Claims. (Cl. 202—176)

This is a continuation of application Serial No. 199,378, filed June 1, 1962.

This invention relates to an improved low temperature vacuum distillation system for liquids, and in particular to an improved vacuum distillation system in combination with an efficient prior deaeration of the raw liquid.

Although the invention is described herein in terms of the conversion of impure water to fresh water, the advantages of the system apply to any liquid distillation or concentrating process where low temperature is desirable and practical and where operative costs are an important factor.

At the present time considerable effort is being directed to the problem of producing fresh water from sea water or other contaminated sources in a practical and economical manner. As is known, naturally fresh water, is being depleted in some parts of the United States, and in other parts the only readily available water is sea water. The primary goal in the field of fresh water production is the conversion of raw water, whether it be sea water, brackish water, or water contaminated with industrial or sewage waste, at a cost which is comparable to that of presently available fresh, pure water.

Obviously, a number of workable processes for producing fresh water from raw sea water or brackish water are known, one of the simplest, in theory at least, being the distillation of the raw water and condensation of the vapor. The problems associated with the evaporation of large amounts of water such as would be needed to supply a city are well known. It has long been known that the presence of dissolved gases in raw water reduces the efficiency of the still and causes corrosion in the water handling equipment. At temperatures above 150° F. the scale forming chemicals are released from the raw water and coat the heat transfer surfaces. This reduces the efficiency of the transfer of heat into the water and thereby adds considerably to the already high heat requirements of a conventional evaporation process. Corrosion of the equipment obviously adds to the cost of the product by requiring constant replacement, shutdown of the system or the use of expensive materials of construction. Various vacuum distillation processes have been suggested and used in an attempt to reduce the scaling and corrosion by operating at temperatures below the atmospheric boiling point. A major problem encountered is the high cost of operating conventional vacuum pumping equipment to produce and maintain the vacuum required to operate the still. In some cases the same problem exists with respect to producing and maintaining the vacuum required to operate ambient temperature deaerating equipment used to treat the raw water prior to entry to the still.

The present invention overcomes the above disadvantages by providing a novel combination of an efficient water-deaeration system and a vacuum distillation system. The deaeration system may be operated at the temperature at which the raw water is obtained and produces substantially gas-free water. The deaerated water is then sent to a vacuum distillation system which may be operated at temperatures below 100° F. where most of the water is evaporated and the vapors condensed. A vacuum, produced by the particular type of deaeration system contemplated in the invention is applied to the still so that the deaerated water therein is substantially at its boiling point. A closed cycle gas compression and expansion system, similar to a refrigeration system, is provided in the distillation system to supply the latent heat of vaporization to the deaerated raw water and to condense the vapor thus formed by absorbing the same amount of heat.

It is the primary object of the present invention to provide an improved process and apparatus for distilling raw or impure liquid and condensing the vapors whereby a pure distillate is obtained at low cost of equipment and power consumption.

It is a further object of this invention to provide an improved low-cost process and apparatus for distilling raw liquid which includes an efficient, low-cost deaeration of the raw liquid thus reducing the corrosion problem within this apparatus.

It is a further object to provide a low-cost distillation system which includes a closed cycle gas compression and expansion system as the means for supplying and absorbing heat in the evaporation and condensation parts, respectively, of the distillation system.

It is a further object to provide a low-cost efficient distillation system which operates at near ambient temperatures thereby reducing heat losses and the formation of harmful scale.

These and other objects will become apparent from a reading of the following description of several embodiments of the invention when taken in conjunction with the drawings in which:

FIGURE 1 is a diagrammatic side elevational view, partly in section of a sea-water conversion system embodying the principles of the present invention;

FIGURE 6 is a diagrammatic elevational view of a modification of the system of FIGURE 1; and FIGURE 7 is a diagrammatic elevational view of another deaerator in combination with the still of FIGURE 1.

Figure 2:
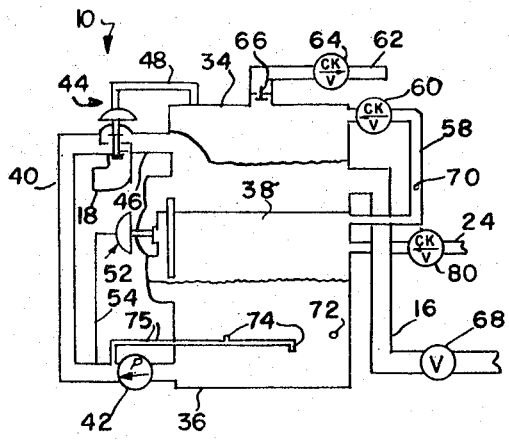
FIGURES 2, 3 and 4 are diagrammatic elevational sectional views of the deaerator of FIGURE 1 illustrating the operation of the same.

Referring to FIGURE 1, it is seen that a fresh water producing system embodying the principles of the present invention includes as its major components, a deaerator 10, a vacuum still 12 and a closed gas compression and expansion circuit 14. Raw water contaminated with dissolved gases, for example sea water, enters the deaerator 10 through an inlet pipe 16 from a source (not shown) and after deaeration is discharged from the deaerator 10 through a pipe 18 which connects with the bottom of the still 12 through heat exchangers 20 and 22. A vacuum line 24 leads from the deaerator 10 to the condensing portion of the still 12 to maintain a vacuum in the latter. Concentrated brine is pumped by a brine pump 26 from the evaporating portion of the still 12 through a pipe 28 to the heat exchanger 22 and then to waste through line 29. Distilled fresh water is pumped by a distillate pump 30 from the still 12 through a pipe 32 to the heat exchanger 20 and then to storage through a line 31.

A preferred construction of a suitable deaerator is that illustrated in FIGURES 1 through 4, it having been found that this construction will reduce the dissolved oxygen gas content of raw water to less than 0.5 part oxygen per million parts of water. As shown, the deaerator 10 includes integral upper and lower chambers 34 and 36, respectively, separated by a solid horizontal partition 38 positioned so as to make the capacity of lower chamber 36 greater than that of the upper chamber 34.

The upper and lower chambers are in communication through a pipe 40 which connects the lower portion of lower chamber 36 to any convenient portion of upper chamber 34. In the lower portion of pipe 40 is a pump 42, such as a centrifugal pump, adapted to pump liquid from the lower chamber 36. Upstream of pump 42 is a three-way valve 44 which is adapted to direct fluid in pipe 40 into deaerator discharge pipe 18 or into the upper chamber 34 through section 46 of pipe 40. As illustrated, valve 44 is a diaphragm valve which is responsive to the pressure in upper chamber 34. A small tube 48 connects the upper chamber with one side of a conventional diaphragm actuator 50 whereby pressures in excess of a predetermined figure place pipe 40 in communication with pipe 18 and pressure below the predetermined figure place pipe 40 in communication with the upper chamber 34.

The upper and lower chambers of the deaerator are in communication at their junction through a downcomer 51 containing a second diaphragm valve 52 which is responsive to the pressure in pipe 40 upstream of pump 42. As seen in the drawings, a small tube 54 connects pipe 40 with a conventional diaphragm actuator 56 whereby valve 52 closes and opens with an increase and decrease, respectively, in pressure in pipe 40.

The upper and lower chambers 34 and 36 are further in communication through a pipe 58 connecting the top portion of lower chamber 36 with the top portion of upper chamber 34. A check valve 60 in pipe 58 permits fluid flow only from the lower to the upper chamber.

Upper chamber 34 is also provided with a gas vent pipe 62 connecting the upper portion of the chamber with the atmosphere. A check valve 64 in pipe 62 permits flow only from the chamber to the atmosphere. Upstream of check valve 64 is a thermodynamic check 66 of known construction which remains open so long as only gas flows therethrough but which closes when liquid begins to pass therethrough as a result of the action of flowing liquid on the device. The raw water inlet pipe 16 connects with upper chamber 34 and is provided with a flow control valve 68.

A liquid level responsive device, such as a conventional liquid level electrode, illustrated at 70, is provided in the lower portion of the pipe 58 and operates through a suitable control circuit (not shown) to start pump 42 when the electrode 70 becomes immersed in liquid. The lower chamber 36 is also provided with a liquid level responsive device, illustrated at 72, and similar to electrode 70 which operates through a suitable control circuit (not shown) to stop pump 42 when the electrode 70 is not immersed in liquid. Electrode 70 should be located at or above the connection between inlet pipe 16 and chamber 34 so that raw water flowing into the deaerator 10 will not actuate the pump 42 until after the lower chamber 36 has been filled, as seen in FIGURE 1. Electrode 72 should be located above the inlet of pump 42 so that a positive head of water is applied to the pump inlet at all times.

Lower chamber 36 may also be provided with means for agitating the liquid therein to aid in the liberation of dissolved gases from the raw water. As shown, a suitable agitating means may take the form of water jets 74 to which water from the discharge of pump 42 is fed through a pipe 75. It is also contemplated that chamber 36 may be partially or entirely filled with Raschig rings or other material for increasing the free surface area of the liquid in the chamber 36.

The vacuum still 12 includes a leak-proof tank 76, preferably elongated in a vertical direction, and an internal tray-like structure for collecting condensed fresh water such as an inclined baffle 78 secured to the walls of the tank 76. The baffle 78 should be positioned generally below the coils 92 although its precise position and its shape and size may vary so long as its water-collecting function is retained.

Distillate pipe 32 connects with the still tank 76 at any location which places the pipe in communication with liquid collected by baffle 78. Pump 30, such as a centrifugal pump, in the product pipe 32 should be below the level of liquid on baffle 78 so that a positive head of liquid may be maintained on the pump inlet. Discharge pipe 18 from the deaerator 10 connects with the heating portion of the still tank 76 so as to effectively condense the hot gas in the coil 90. The brine discharge line 28 is connected to the still tank at a location below the liquid level therein. Preferably, a baffle 79 or other arrangement will result in brine being drawn off from the upper portion of the liquid in the tank. Vacuum line 24 connects with the upper portion of tank 76 at a location which is outside the water-collecting pocket formed by baffle 78 and which is so related to cooling coil 92 that vapors are not withdrawn. A check valve 80 in line 24 permits fluid flow only into the deaerator 10.

The still 12 may also be provided with a liquid level responsive device, illustrated at 82, which through a suitable control circuit, illustrated by dotted line 84, operates the raw water inlet valve 68 to the deaerator. The device 82 is located at the desired liquid level in tank 76 and actuates valve 68 thus regulating the flow of raw water into the deaerator 10 and maintaining a relatively constant liquid level in the still tank 76.

The gas compression system 14 includes a mechanically driven blower, or compressor 86 and a sealed line 88 leading from the blower outlet through the still 12 back again to the blower inlet. Line 88 includes two coiled heat-transfer sections 90 and 92 positioned in the heating and condensing portions of the still tank 76, respectively. The condenser coils 92 are positioned above baffle 78 so that condensate dripping from their exterior surfaces will be collected by the baffle. The heating coils 90 are positioned in any manner so as to be immersed in the liquid in the heating portion of the still. The size, shape, and number of the coils will vary depending on the capacity of the still, the temperatures involved and in such a way as to provide for efficient heat transfer.

In the operation of the water conversion system illustrated in FIGURE 1, the deaerator 10 functions to provide deaerated water to the still 12 and simultaneously to maintain a vacuum in the still. The operation of the deaerator is cyclic and is fully illustrated in FIGURES 1 through 4 each of which illustrates a step in a complete deaeration cycle.

In FIGURE 1, the deaerator 10 is receiving a charge of raw water through raw water inlet pipe 16 from a source (not shown) under the action of a vacuum in the deaerator or by means of a pump (not shown) in pipe 16 or by means of gravity if the source is elevated above the deaerator. The water passes from pipe 16 over partition 38, through valve 52 into the lower chamber 36, and continues to rise until its level reaches electrode 72. Electrode 72 then actuates pump 42.

As seen in FIGURE 2 pump 42 then begins discharging the raw water to the upper chamber 34 through pipe 40 and valve 44. Simultaneously, valve 52 is closed by the pump discharge pressure whereby displacement of the water from the lower chamber 36 results in a high vacuum in that chamber. The actual pressure realized in lower chamber 36 is approximately the vapor pressure of the water in the chamber and thus will vary with the water temperature. In practice, a vacuum of about 29 inches of mercury is realized with water at about 70° F. At this vacuum, particularly if the water is agitated by operation of jets 74, substantially all dissolved gases are liberated from the water in the form of minute bubbles which quickly separate from the liquid by flotation and collect in the upper portion of the lower chamber 36. As the upper chamber 34 fills with water, any gases in that chamber are forced out of vent pipe 66 to the atmosphere.

Figure 3:
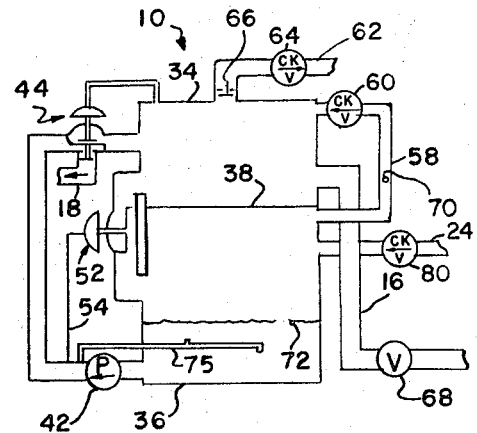

As illustrated in FIGURE 3, when the water level in the upper chamber 34 reaches valve 66, the kinetic energy of the water causes the valve to close. The pressure in the upper chamber then rises as the result of continued operation of pump 42 and causes the 3-way valve 44 to direct water from the lower chamber 36 into pipe 18 leading to the vacuum still 12. Pump 42 continues to operate until the water level in the lower chamber 36 drops to below electrode 72.

It is apparent that only highly deaerated water is discharged into pipe 18, because the first fraction of water removed from the lower chamber is retained in the upper chamber. Obviously, this first fraction contains some dissolved gases not only because it has not been subjected to a vacuum for as long a time as the later fraction, but also because it may pick up additional gas when discharged into the upper chamber. It is apparent, however, that this partially deaerated fraction is returned to the lower chamber 36 for further deaeration in the next cycle. Thus, the water discharged through pipe 18 has, in part, been subjected to a number of deaeration cycles and contains substantially no dissolved gases. As noted previously, this is extremely important if corrosion is to be avoided in the still 12. It has been found by chemical analysis of the discharge from this deaerator that the oxygen content of raw water can be reduced to about 0.2 to 0.4 part per million.

Figure 4:
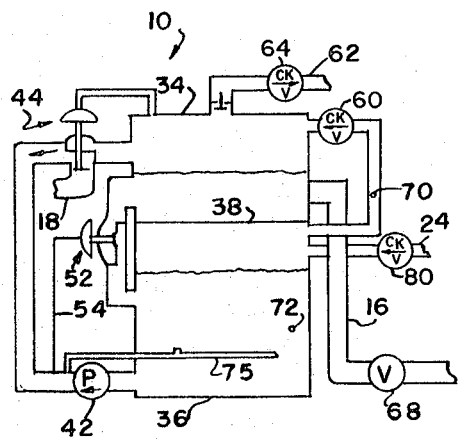

FIGURE 4 illustrates the action of the deaerator after pump 42 has been stopped by electrode 72. The lack of pump pressure causes valve 52 to open whereupon the water in the upper chamber 34 flows by gravity into the lower chamber 36, and the liberated gases in the lower chamber 36 are displaced through pipe 58 and check valve 60 into the upper chamber 34. At this point the apparatus is ready to receive another charge of raw water and to begin again the operation illustrated in FIGURE 1. Since both chambers are at a vacuum the next charge of raw water can conveniently be drawn into the apparatus merely by opening valve 68. As seen in FIGURE 1, valve 68 may conveniently be operated by control circuit 82 in response to the level of water in the still 12.

The deaerated raw water from the deaerator 10 is partially evaporated in still 12 at only slightly higher temperature than it leaves the deaerator. This is accomplished by maintaining the still at a vacuum such that the water therein is substantially at its boiling point and needs only to have added to it the latent heat of vaporization. According to the invention, the vacuum is drawn on the still 12 by connecting the still with the lower chamber 36 of the deaerator 10 by means of line 24. As it is apparent from the preceding description of the deaerator operation, a vacuum is present in the lower chamber 36 except after a fresh charge of raw water has entered. Check valve 80 in line 24 prevents loss of vacuum in the still 12 at any time that the pressure in the chamber 36 exceeds that in the still 12.

In theory, a vacuum once established in the still 12 would remain effective because no gas is intended to enter the still. As a practical matter, some gas may enter the still as a result of leaks or temporary malfunction of the deaerator and thereby tend to destroy the vacuum. The cyclic vacuum pulled through line 24 not only assures a vacuum in the still but also assures that any gas which reaches the still will not be permitted to remain and thereby cause corrosion parts of the still.

The operation of the gas compression and expansion cycle 14 to vaporize the deaerated water and to condense the vapors is analogous to that of a conventional refrigeration system. The refrigerant may be one having a boiling point slightly below that of the water in the still 12, is compressed by blower 86 and thereby heated to above the temperature of the water in the still. When passed through coils 90 in the heating portion of the still, the hot compressed gas gives up its latent heat of vaporization to the water in the still and is condensed to a liquid. Simultaneously, some of the water in the still is vaporized.

The liquified refrigerant then passes to coils 92 in the condensing portion of the still where it vaporizes by absorbing the latent heat of vaporization of the water vapor in the still. Some of the water vapor is thereby condensed on the coils 92 and runs off onto the baffle 78 where it is collected. The vaporized refrigerant returns to the blower 86 and is again compressed. The theoretical work or heat of compression applied to the refrigerant by the blower is that required (1) to overcome the resistance of the complete refrigerant circuit, (2) to maintain economical design temperature differences between heating and condensing coils and (3) to replace equipment heat losses and heat lost from the system as a result of heat gain by the product and brine streams.

Theoretically, it is possible to vaporize the water in the still and condense the vapors at the same temperature by supplying and absorbing only the latent heat of vaporization at the boiling point of the water. This optimum condition is desirable because the distillation can be carried out at the temperature of the raw water and thus avoid the excess heat losses. However, since the optimum condition cannot be obtained because of fluctuations in raw water temperature and in the economical heat transfer characteristics of the coils 90 and 92 and other variables, some increase in water temperature occurs in the still. In order to conserve the heat as much as possible, both the product water and the concentrated brine discharged from the still are passed in heat-exchange relationship with the deaerated water in pipe 18. Since the product water in pipe 32 is slightly cooler than the brine in pipe 28, the incoming water in pipe 18 is first heated by the product water in heat exchanger 20. Since the still is under a vacuum, pumps 26 and 30 are required to discharge the brine and product water to the atmosphere.

The ratio of product water flow in pipe 32 to brine flow in pipe 28 is preferably maintained as high as possible in order to reduce the amount of heat discarded with the brine. Obviously, however, the concentration of the brine must not be permitted to rise to the level at which solids will be precipitated in the still or heat exchanger 22. The flow figures and temperatures noted on the flow sheet of FIGURE 1 are indictaive of approximate values obtainable with the system but are not intended to be thermodynamically precise. It will be seen that the heat losses in the system are very small not only because the distillation equipment may be operated at approximately 92° F., but also because the discharge temperature of product water and brine is only five degrees higher than the raw water temperature. Even more important in the saving of power consumption in the present system is the relatively small mechanical energy required to operate the pumps 26, 30 and 42 and the blower 86. It has been calculated that for a system producing 1,000 gallons/hr. of fresh water from 1,250 gallons/hr. of raw water, the pumps require no more than 5 hp. The blower requires only about 40 hp. when operating at a pressure differential of about 3 p.s.i. with a suitable refrigerant such as one of the Freons.

Figure 5:
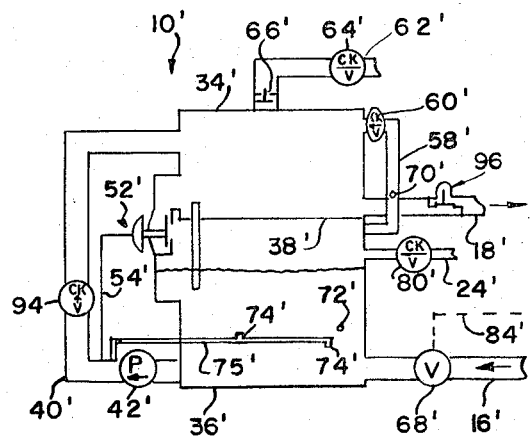
FIGURE 5 is a diagrammatic elevational view of a slightly different deaerator suitable for use in the system of the invention.

A somewhat different form of deaerator suitable for use in the water conversion system of the present invention is illustrated in FIGURE 5 wherein primed reference numerals are used for similar parts. The deaerator 10′, like the one previously described, includes integral upper and lower chambers 34′ and 36′, respectively, separated by a horizontal partition 38′ positioned so as to give the lower chamber 36′ greater capacity than the upper chamber 34′.

A pipe 40′ connects the upper and lower chambers 34′ and 36′ and includes a pump 42′ in its lower portion for discharging liquid from the lower chamber 36′. A check valve 94 permits flow through the pipe 40′ only from the lower chamber. The upper and lower chambers 34′ and 36′ of deaerator 10′ are in communication at their junction through a diaphragm valve 52′ which is made responsive to the pump discharge pressure by means of tube 54'. The chambers are further in communication through a pipe 58' provided with a check valve 60' and a liquid level responsive device 70'.

The upper chamber 34' is provided with a gas vent 62' having check valve 64' and liquid check 66'. Deaerator discharge pipe 18' connects directly with the lower portion of the upper chamber 34' and is provided with a spring-loaded valve 96 which is adapted to open when the pressure in the upper chamber exceeds a predetermined value.

A raw water inlet pipe 16' containing a valve 68' connects with the lower portion of the lower chamber 36' rather than with the upper chamber as in deaerator 10 in FIGURES 1–4. A liquid level responsive device 72' is provided in chamber 36' for stopping pump 42' and a vacuum line 24' including a check valve 80' is provided for drawing a vacuum on the still 12.

The operation of deaerator 10' is similar to that of the deaerator 10 of FIGURES 1–4 except that some of the first fraction of water removed from the lower chamber 34' opens spring-loaded valve 96 in pipe 18' so that deaerated water may be delivered to the still 12. When the water level drops to electrode 72', pump 42' is stopped, valve 52' opens, and the water remaining in the upper chamber 34' flows by gravity into the lower chamber 36'. The apparatus is then ready to receive another charge of raw water from pipe 16'.

The deaerator 10' may be substituted for deaerator 10 in the system of FIGURE 1 merely by connecting pipes 18' and 24' to the still 12 in the same manner as are pipes 18 and 24.

FIGURE 6 illustrates a modification of the system of FIGURE 1 wherein an accumulator tank 98 is connected between the deaerator 10 and the still 12. As shown, deaerator discharge pipe 18 is connected to the lower portion of the accumulator 98, and vacuum line 24 is connected to the top portion thereof. Pipe 18a and line 24a connect the accumulator 98 with the still so as to deliver water and to draw a vacuum as described previously. Raw water inlet valve 68 in pipe 16 may conveniently be operated in response to the water level in the accumulator 98 by a suitable control circuit 100 so as to maintain the level in the accumulator relatively constant. The delivery of water to the still may be made responsive to the water level in the still by means of a valve 102 in pipe 18a and a suitable control circuit 104. In this arrangement, even better deaeration of the raw water may be achieved as a result of the additional time that the water is maintained under vacuum. Further, the cyclic discharge of deaerated water through pipe 18 is compensated for.

FIGURE 7, in which double-primed numerals identify elements similar to those already described, illustrates a further embodiment of a deaerator in combination with a vacuum still 12" identical with that of FIGURE 1. In this embodiment the deaerator is a single, uncompartmented tank 106 having an inlet pipe 16", and an outlet pipe 18" and an upper vent pipe 62" provided with a check valve 64". A pump 112 in the inlet pipe 16" provides positive feed to the tank from a raw water source (not shown) and a valve 113 in the pump discharge permits the tank 106 to be sealed from the raw water source when desired. A pair of vertically spaced liquid level electrodes 116 and 118 within the tank 106 are provided with a suitable control circuit 114 leading to the pump 112 so as to maintain a desired water level within the tank. A pump 108 in the discharge line 18" provides positive discharge from the tank 106 and a check valve 120 in the pump inlet permits liquid flow only in the discharge direction.

The deaerator tank 106 may be provided with jets or other agitating means for the liquid therein and may contain Raschig rings or other means for increasing the free liquid surface. The system of FIGURE 7 may also include a vacuum accumulator tank between the tank 106 and the still 12" in the manner described with respect to FIGURE 6.

In operation, the deaerator of FIGURE 7 is filled with raw water to the level of electrode 118 by opening valve 113 and operating the inlet pump 112. The valve 113 is then closed either manually or by a suitable control system which takes its signal from, for example, electrode 118. The discharge pump 108 is then operated to begin pumping water through discharge pipe 18" and heat exchangers 20" and 22" to the vacuum still 12". A boiling point vacuum is simultaneously formed in the tank 106 whereby dissolved gases are liberated from the water therein. When the liquid level in the still 12" rises to a predetermined level the pump 108 is stopped by means of a control circuit 110. When the water level in the tank 106 drops to below electrode 116, the valve 113 is opened and the pump 112 is automatically actuated to feed more water into the tank. The gases liberated in the tank during operation of the discharge pump 108 are forced out the vent 62" during this operation.

A vacuum line 24" leading from the deaerator tank 106 to the top of the still 12" draws a vacuum in the still during operation of the pump 108 and a check valve 80" in the line 24" prevents loss of a vacuum in the still during operation of the inlet pump 112. As in the operation of the still of FIGURE 1, distilled product water is removed through a pipe 32" by a pump 30" and is passed through the heat exchanger 20" to transfer some of its heat to the deaerated water being fed to the still. Brine is removed through pipe 28" by pump 26" and is passed through heat exchanger 22" before being discharged to waste.

Thus it will be appreciated that a novel, efficient and economical system for distilling liquids while avoiding corrosion and scale formation has been devised. While several modifications of the invention have been described in terms of the treatment of raw water, it is not intended that the invention should be limited to the treatment of any particular liquid or to the details of the disclosed embodiments except as they appear in the appended claims.

What is claimed is:

1. Apparatus for evaporating a liquid and condensing the vapors thereof comprising:

liquid degasifying means including sealable tank means for enclosing a charge of liquid and an overlying vapor portion, vent means in communication with the interior of said tank means above the charge of liquid and including valve means for alternately sealing and unsealing said tank means, liquid pumping means operable at a high liquid level in said tank means to pump liquid out of said tank means when said tank means is sealed thereby producing degasified liquid by producing a vacuum in said tank means to cause dissolved gases to be liberated from liquid remaining in said tank means and to be collected in overlying relationship to said remaining liquid, means for intermittently introducing additional liquid into said tank means thereby displacing previously liberated gases through said vent means;

still means having a liquid receiving chamber and a vapor retaining chamber communicating therewith;

transfer means including a conduit and a valve for intermittently withdrawing said degasified liquid from said tank means and for transferring the withdrawn degasified liquid to said liquid receiving chamber;

means for continually maintaining said vapor retaining chamber under vacuum including a conduit interconnecting said vapor retaining chamber and said tank means and a valve in said conduit connected to pass gas only from said vapor retaining chamber to said tank means;

heating means associated with said liquid receiving chamber for evaporating liquid therein;

cooling means associated with said vapor retaining chamber for condensing vapor from said liquid receiving chamber;

means for collecting and withdrawing condensed vapor from said vapor retaining chamber;

and means for withdrawing unvaporized liquid from said liquid receiving chamber.

2. Apparatus for evaporating a liquid and condensing the vapors thereof comprising: liquid degasifying means including vapor-tight tank means for enclosing a charge of liquid and an overlying vapor, means for sealing the overlying vapor in the tank means to establish said vapor-tight tank means and liquid pumping means for pumping liquid out of said tank means thereby lowering the pressure in said tank means to cause dissolved gases to be liberated from liquid in said tank means; still means having a liquid receiving chamber and a vapor retaining chamber communicating therewith; means for conducting the said degasified liquid from said tank means under liquid level control in said tank means to said liquid receiving chamber; means for continually maintaining said vapor retaining chamber under vacuum including a conduit interconnecting said vapor retaining chamber and said tank means and a valve in said conduit connected to pass gas only from said chamber to said tank means; heating means associated with said liquid receiving chamber for evaporating liquid therein; cooling means associated with said vapor retaining chamber for condensing vapor from said liquid receiving chamber; means for collecting and withdrawing condensed vapor from said vapor retaining chamber; and means for withdrawing unvaporized liquid from said liquid receiving chamber.

3. Apparatus as in claim 1 further comprising: means for introducing liquid into said tank means; and means responsive to liquid level in said still means for controlling said introducing means.

4. Apparatus as in claim 1 further comprising: means for introducing liquid into said tank means; means responsive to the liquid level in said tank means for controlling said introducing means; means responsive to the liquid level in said still means for controlling the flow of liquid from said tank means to said still means through said transfer means.

5. Apparatus as in claim 1 wherein said means for transferring degasified liquid from said tank means to said still means includes an accumulator tank for storing degasified liquid, said accumulator tank being connected to said tank means and to said still means by conduits which conduct the degasified liquid, said accumulator tank having a vapor containing portion and a liquid containing portion; and means for maintaining the interior of said accumulator under vacuum, said means including valve means connected between said tank means and the vapor containing portion of said accumulator tank for passing gas only from said vapor containing portion to said tank means.

6. Apparatus as in claim 5 further comprising: means responsive to the liquid level in said still means for controlling the flow of degasified liquid through the conduit from said accumulator tank to said still means.

7. Apparatus as in claim 1 further comprising; means for passing liquid withdrawn from said still means in heat exchange relationship with liquid delivered to said still means.

8. Apparatus as in claim 1 wherein said heating and cooling means include a compressor for a refrigerant gas and a closed conduit extending from said compressor to said liquid receiving chamber of said still means then to said vapor retaining chamber and then back to said compressor.

9. Apparatus as in claim 1 further comprising: agitator means in said tank means for agitating liquid therein.

10. Apparatus for evaporating a liquid and condensing the vapors thereof comprising: means for degasifying the liquid prior to evaporation including:

means defining first and second chambers, said second chamber being above said first chamber, conduit means for delivering liquid to said first chamber, liquid pumping means having its inlet in communication with said first chamber below the level of liquid therein and its outlet in communication with said second chamber whereby operation of said liquid pumping means produces a boiling point vacuum in said first chamber for degasifying liquid therein and delivers liquid to said second chamber, valve means between said chambers; means responsive to operation of said liquid pumping means for closing said valve means, and check valve means connected between said chambers for passing fluid only from said first chamber to said second chamber;

a still having a liquid vaporizing portion and a vapor condensing portion, said still including:

collecting means for distilled liquid therein; a liquid outlet for discharging distilled liquid, a liquid outlet for discharging undistilled liquid, said still having its vaporizing portion in communication with said second chamber whereby deaerated liquid may be delivered to said still, and its condensing portion in communication with said first chamber through valve means connected to pass gas from said condensing portion whereby a vacuum may be drawn in said still;

and means for supplying and absorbing heat in order to evaporate liquid and condense vapors within said still including:

a heating conduit in said vaporizing portion of said still, a cooling conduit in said condensing portion of said still, and gas compressing means, said heating conduit, said cooling conduit and said compressing means being interconnected in a closed circuit.

11. Apparatus as in claim 10 further comprising: heat exchanger means connected between the outlet of said liquid pumping means and said vaporizing portion of said still for passing liquid delivered to said still in heat exchange relationship with liquid discharged from said still.

12. Apparatus as in claim 10 including first heat exchanger means further connected to said distilled liquid outlet in said still and second heat exchanger means further connected to said undistilled liquid outlet in said still.

13. Apparatus as in claim 10 further comprising: valve means in said conduit means for delivering liquid to said first and second chambers, and means responsive to liquid level in said still for controlling said valve means.

14. Apparatus as in claim 10 further comprising: an accumulator tank connected by conduits to said still and to said second chamber and having a vapor containing portion and a liquid containing portion, said check valve means being connected in the conduit between said vapor containing portion and said first chamber; and a conduit connecting said vapor containing portion with said condensing portion of said still, and said vapor containing portion being in communication with said pump means inlet and with said condensing portion of said still.

15. Apparatus as in claim 10 further comprising: agitator means in said first chamber for agitating liquid therein.

16. Apparatus for evaporating a liquid and condensing the vapors thereof comprising: means for degasifying the liquid prior to evaporation including:

means defining first and second chambers, said second chamber being above said first chamber, conduit means for delivering liquid to said first chamber, liquid pumping means having its inlet in communication with said first chamber below the level of liquid therein, and its outlet in communication with said second chamber through a flow distribution valve means whereby operation of said liquid pumping means produces a boiling point vacuum in said first chamber for degasifying liquid therein and delivers liquid to said second chamber, valve means between said chambers; means responsive to operation of said liquid pumping means for closing said valve means and valve means connected between said chambers for passing fluid only from said first chamber to said second chamber;

a still having a liquid vaporizing portion and a vapor condensing portion, said still including:

collecting means for distilled liquid therein; a liquid outlet for discharging distilled liquid, a liquid outlet for discharging undistilled liquid, said still having its vaporizing portion in communication with said flow distribution valve means whereby deaerated liquid may be delivered by said liquid pumping means from said first chamber to said still, said still having its condensing portion in communication with said first chamber whereby a vacuum may be drawn in said still;

and means for supplying and absorbing heat in order to evaporate liquid and condense vapors within said still including:

a heating conduit in said vaporizing portion of said still, a cooling conduit in said condensing portion of said still, and gas compressing means, said heating conduit, said cooling conduit and said compressing means being interconnected in a closed circuit.

No references cited.

NORMAN YUDKOFF, *Primary Examiner.*

F. E. DRUMMOND, *Assistant Examiner.*